(12) United States Patent
Girard et al.

(10) Patent No.: US 11,744,270 B2
(45) Date of Patent: Sep. 5, 2023

(54) COOLING PARTICULATE MATERIAL WITH NITROGEN

(71) Applicants: John M Girard, Downers Grove, IL (US); Soujanya N Jampala, Chicago, IL (US); Balazs Hunek, Western Springs, IL (US); Yeu-Chuan Simon Ho, Naperville, IL (US); Richard N Hasty, Monee, IL (US); Steven McCarty, Glendale Hgts, IL (US)

(72) Inventors: John M Girard, Downers Grove, IL (US); Soujanya N Jampala, Chicago, IL (US); Balazs Hunek, Western Springs, IL (US); Yeu-Chuan Simon Ho, Naperville, IL (US); Richard N Hasty, Monee, IL (US); Steven McCarty, Glendale Hgts, IL (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 17/525,008

(22) Filed: Nov. 12, 2021

(65) Prior Publication Data

US 2022/0071243 A1 Mar. 10, 2022

Related U.S. Application Data

(63) Continuation of application No. 16/558,920, filed on Sep. 3, 2019, now Pat. No. 11,202,457.

(60) Provisional application No. 62/727,264, filed on Sep. 5, 2018.

(51) Int. Cl.
*A23L 3/375* (2006.01)
*F25D 3/10* (2006.01)
*F25D 29/00* (2006.01)

(52) U.S. Cl.
CPC .............. *A23L 3/375* (2013.01); *F25D 3/10* (2013.01); *F25D 29/001* (2013.01)

(58) Field of Classification Search
CPC . F25D 3/10; F25D 29/01; A23L 3/375; A23L 3/363; B05B 7/00
See application file for complete search history.

(56) References Cited

U.S. PATENT DOCUMENTS

| 11,202,457 B2 | 12/2021 | Girard et al. | |
| 2002/0162349 A1* | 11/2002 | Lang | A23B 4/064 62/381 |
| 2004/0255599 A1* | 12/2004 | Moller | F25D 3/10 62/64 |
| 2007/0006599 A1* | 1/2007 | Kawamura | F25C 1/00 62/54.1 |

(Continued)

FOREIGN PATENT DOCUMENTS

| DE | 3347937 A1 | 10/1985 |
| EP | 1604950 A1 | 12/2005 |

(Continued)

*Primary Examiner* — Elizabeth J Martin
(74) *Attorney, Agent, or Firm* — Donald T. Black

(57) ABSTRACT

Particulate material is cooled by passing into the material a coolant stream of liquid nitrogen having a gaseous product around at least a portion of the liquid nitrogen, wherein the coolant stream is formed outside the particulate material in a nozzle body from which the coolant stream is passed into the particulate material.

13 Claims, 2 Drawing Sheets

(56) References Cited

U.S. PATENT DOCUMENTS

2010/0162732 A1\* 7/2010 Newman .................. F25D 3/11
 62/515
2020/0166266 A1\* 5/2020 Madsen .................. A23B 9/10

FOREIGN PATENT DOCUMENTS

| EP | 3127433 | A1 | 2/2017 |
|---|---|---|---|
| WO | 03/030663 | A1 | 4/2003 |

\* cited by examiner

COOLING PARTICULATE MATERIAL WITH NITROGEN

RELATED APPLICATIONS

This application claims the benefit of U.S. Non-Provisional application Ser. No. 16/558,920, filed on Sep. 3, 2019, which issued as U.S. Pat. No. 11,202,457 on Dec. 21, 2021, and which claims the benefit of Provisional Application Ser. No. 62/727,264, filed on Sep. 5, 2018, which is incorporated herein by reference.

FIELD OF THE INVENTION

The present invention relates to cooling particulate material as it is contained in carrier equipment, such as vessels and containers that hold the material, and such as conduits within which the material is flowing typically while combined with air or other gaseous transport medium. The particulate material with which this invention may be practiced includes but is not limited to food products, including finished food products (i.e. products which need only to be packaged to be available for purchase and consumption), as well as individual ingredients which are to be combined with other ingredients and further processed into finished food products, and mixtures of individual ingredients.

BACKGROUND OF THE INVENTION

Often in the preparation or processing or transportation of material that is in particulate form, it becomes necessary to pass the material from one location to another while in the form of finely divided solid particles or powders. Examples include passing flour in its finely divided form from storage silos to equipment such as mixers or other equipment in which the flour can be processed or combined with other ingredients for further processing. In conventional practice, the food product is fed into a tube in which gaseous transport medium (typically, air) is flowing. The food product is entrained in the transport medium, and the entrained food product is carried in the tube to its intended processing destination. In other modes of processing particulate material, it is held, stored or weighed in a carrier such as a vessel or container or scale hopper and may be moved within the carrier such as by stirring or agitation. Examples of such modes include mixers, hoppers and blenders.

Regardless of what the particulate material is, and regardless of the particular mode of treating the material, operators wish to be able to cool the material, to control the temperature of the material, and to control against increases in the temperature of the material. In some instances, the material is already warm, perhaps from a location where it has been stored or has been produced. In other instances, the movement of the material in a conduit or in apparatus such as a mixer could increase the temperature of the material. Various techniques have been attempted to control the temperature (or control the increase in the temperature) of particulate material in such situations. While the introduction of gas or liquid at cryogenic temperatures (that is, temperatures at which a material which is gaseous at room temperature and pressure is in its liquid state) might seem to be an appropriate technique to cool or to control the temperature of the material, this technique has up to now suffered drawbacks as the very low temperatures of the cryogen that is introduced can cause water vapor or liquid moisture that is present in the material (or the gaseous transport medium when such is being used) to condense and even freeze. This condensing or freezing leads to causing the particles of material to coalesce into clumps and coatings, thereby clogging the equipment being used and also degrading the ability of the particulate material to be mixed with other ingredients or to be otherwise processed.

The present invention provides an effective technique for cooling and controlling the temperature of particulate material (such as food product) that overcomes the obstacles that have been experienced with other techniques.

BRIEF SUMMARY OF THE INVENTION

One aspect of the present invention is a method of cooling particulate material, comprising feeding liquid nitrogen into a cavity in a nozzle body, wherein the cavity has an open discharge opening, to form a stream of the liquid nitrogen in the cavity, wherein the nozzle body is attached to the exterior of a wall of a carrier having an opening through the wall so that the discharge opening of the cavity is aligned with said opening, feeding a gaseous product out of an opening into the cavity, so that the gaseous product is in contact with the outer surface of the stream of liquid nitrogen within the cavity thereby forming a coolant stream in the cavity that consists of gaseous product around at least a portion of the liquid nitrogen, and passing the coolant stream out of the discharge opening of the cavity directly through the opening in the carrier wall into particulate material in the carrier while the particulate material is in motion passing the discharge opening, so that the coolant stream contacts and cools the particulate material in the carrier.

Preferably, the liquid nitrogen and the gaseous product are fed into the nozzle body at a rate of 0.1 to 20 pounds, more preferably 0.5 to 20 pounds, and yet more preferably 0.5 to 3.0 pounds, of liquid nitrogen per scf of gaseous product.

As used herein, material is "particulate" if it is in the form of multiple solid particles and a mass of the particles can flow freely. Preferred longest dimension of particulate material is 0.01 micron to 1000 microns (i.e. to 1 millimeter).

As used herein, a "carrier" is any equipment that can hold particulate material, whether the material in the equipment is stationary, such as storage bin or vessel or hopper, is occasionally in motion within the equipment, such as mixer or blender, or is flowing through the equipment, such as in a conduit of a pneumatic conveying system or a system in which product is impelled by a rotating axial screw.

DETAILED DESCRIPTION OF THE INVENTION

The present invention is useful in connection with cooling of any particulate material in a carrier. Preferred particulate material includes food products, including flour and other starches, sugar, cocoa powder, corn (as whole kernels or kernels that have been subdivided into material such as corn meal), soy-derived products, hemp, and the like. In this context, the food product is in the form of particulate or powdered solids. Other suitable particulate material includes particles of organic matter such as plastics, inorganic matter such as metal, metal ores, sand, gravel, and cement, and mixtures of any of the foregoing.

A preferred type of carrier is a conduit in which food product or other particulate material is entrained in transport air or other gaseous transport medium and flows through the conduit. Suitable gaseous transport medium may be air, nitrogen, argon, carbon dioxide, or air enriched with nitrogen, argon, or carbon dioxide, or other gaseous compositions, provided that the gas is not harmful to the material being transported. Other useful types of carriers include mixers and blenders, wherein the particulate material is stirred or agitated, and wherein other ingredients may be added into the carrier to be combined with the particulate material.

Figure 1:
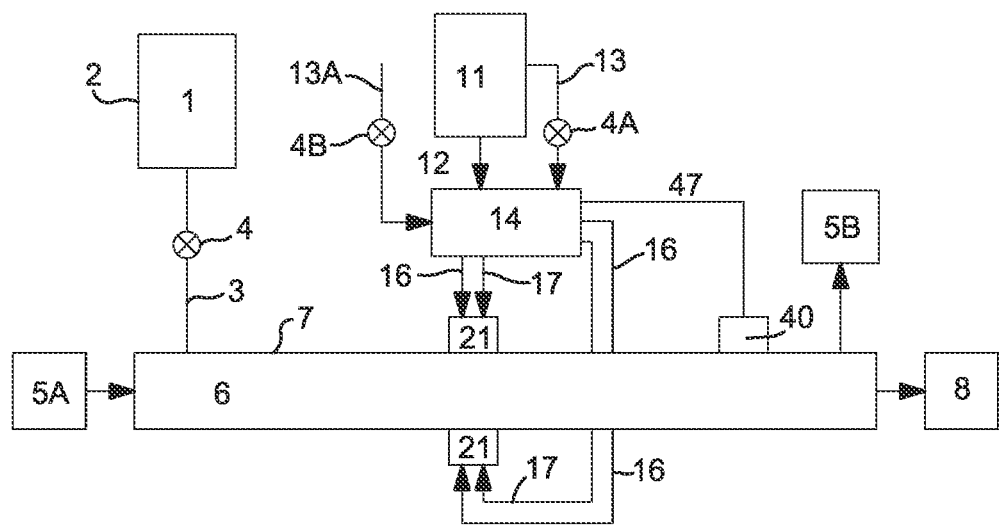
FIG. 1 is a flowsheet of an embodiment of apparatus that processes particulate material, illustrating the inclusion of equipment which the present invention can be practiced.

Reference is now made to FIG. 1, which illustrates the application of equipment for employing the present invention with the type of carrier that is a conduit in which the particulate material is flowed. As seen in FIG. 1, particulate material 1 is contained in storage unit 2 which typically is a silo or other large bulk or particulate handling equipment which may also comprise equipment such as a sifter and/or hammer mill. Material 1 can be flowed through line 3 into conduit 7. Conventional valving and controls that can open and close off the flow into line 3, and that can control the rate of flow into line 3, are indicated generally as 4. Gaseous transport medium, typically air, is provided in any manner that is conventional in this field of technology, such as fans or blowers that push the flow (represented as 5A) or fans that apply suction to pull the flow (represented as 5B). Feeding material 1 into the flow of the gaseous transport medium forms stream 6 of the material entrained in the transport medium and flowing along the length of conduit 7. The destination of the stream 6 is indicated generally as 8 and may be equipment in which the material is further processed or is combined with other ingredients.

FIG. 1 also depicts apparatus useful in practicing the present invention. Tank 11 contains liquid nitrogen, from which stream 12 of liquid nitrogen and stream 13 of gaseous nitrogen can be withdrawn to be administered as described below. Where a gaseous product other than nitrogen is employed as described below, it is supplied via line 13A. It will of course be recognized that 4A and 4B represent valving and controls that can open and close off flows into, and can control the rate of flow into, streams 13 and 13A respectively. Other gaseous products that may be suitable for use in this invention include argon, air, mixtures of argon and nitrogen, and any other substances and mixtures that will not react adversely with liquid nitrogen nor with the particulate material.

Stream 12 and lines 13 or 13A, as the case may be, pass their contents to flow controller 14 which meters amounts of liquid nitrogen into line 16 and amounts of gaseous nitrogen or other gaseous composition into line 17 which respectively are connected to nozzle body or bodies 21 as is described in more detail below. While two nozzle bodies 21 are depicted, along with the lines 16 and 17 associated with each nozzle body 21, it should be noted that the present invention can be practiced using only one nozzle body 21, or with many more nozzle bodies 21 which are spaced along the length of and around the circumference of conduit 7. It is preferred to use pairs of nozzle bodies, which are positioned diametrically across conduit 7 from each other, to provide good mixing of the nitrogen coolant stream (described below) with the stream 6 of food product in the conduit, and to lessen the risk of forming "cold spots" on an interior wall of conduit 7 across from a location where a nitrogen coolant stream enters conduit 7.

Depending on the length of the conduit 7, there may be up to 10 or up to 20 or even up to 120 nozzle bodies 21. The number and spacing of the multiple nozzle bodies depends on the temperature and flow rate of the stream 6 in conduit 7, and on the desired temperature control or temperature reduction that the operator desires to impart to the material in conduit 7.

Figure 2:
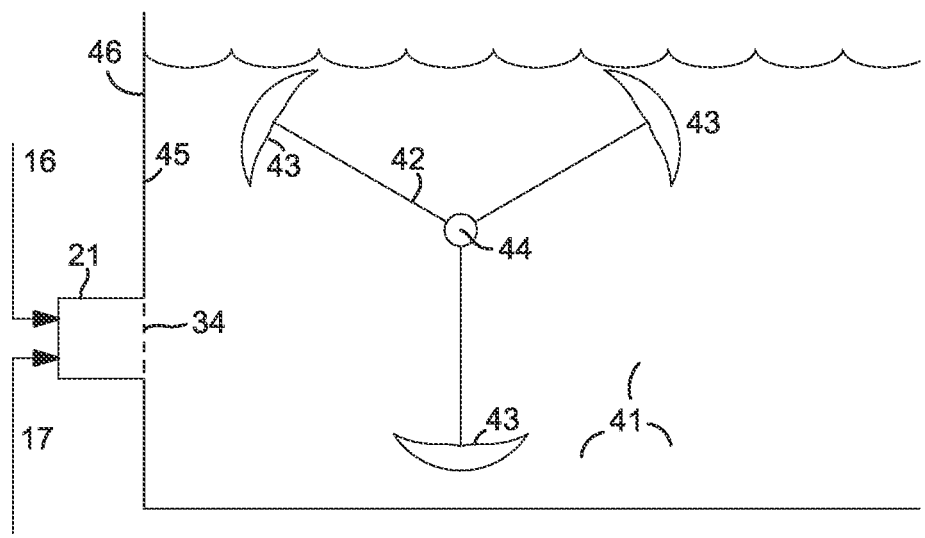
FIG. 2 is a cross-sectional view of another embodiment of apparatus that processes particulate material, illustrating the inclusion of equipment with which the present invention can be practiced.

FIG. 2 illustrates an embodiment of another type of carrier equipment with which the present invention can be employed. In FIG. 2, reference numeral 46 refers to carrier equipment, as that term is used herein, such as a blender or mixer, within which particulate material 41 is stirred or agitated by stirrer 42 in which blades 43 rotate around axle 44. The stirrer causes the material 41 to move past discharge opening 34 of nozzle body 21 which is attached to the wall 45 of carrier 46. Line 16 feeds liquid nitrogen to nozzle body 21, and line 17 feeds nitrogen gas or other gaseous composition to nozzle body 21. It will of course be recognized that one, two, or more nozzle bodies 21 can be provided along the wall 45 of equipment of the type illustrated as carrier 46.

Figure 3:
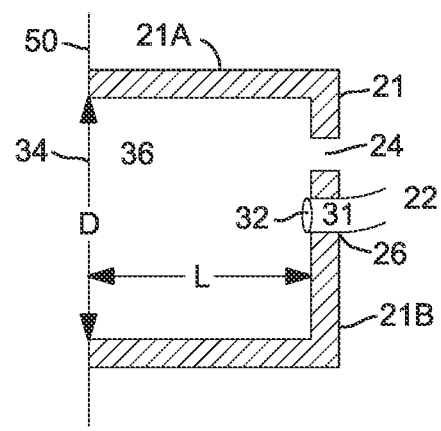
FIG. 3 is a cross-sectional view of an embodiment of equipment with which the present invention can be practiced.

Referring now to FIG. 3, a nozzle body 21 is attached to the outside wall 50 of a carrier for particulate material. Wall 50 could be the wall of conduit 7 within which stream 6 of particulate material flows, or wall 50 could be the wall 45 of carrier equipment 46. Nozzle body 21 has solid sides 21A and a solid closed end 21B. In this embodiment, openings 24 and 26 are both in the end 21B of nozzle body 21. However, opening 24 can be in a side 21A of nozzle body 21. Opening 24 can be connected to line 17. There can be one or more than one opening 24, each connected to a line 17. Opening 26 can be connected to line 16. Cavity 36 is the interior of nozzle body 21. Cavity 36 opens at its discharge opening 34 at which the nozzle body 21 is attached to wall 50 to match with a hole in wall 50. Preferably, the central axis of discharge opening 34 is perpendicular to wall 50. The cavity 36 is typically cylindrical.

Feed tube 31 has an upstream end 22 that can be connected to line 16 through which liquid nitrogen is conveyed into feed tube 31. Feed tube 31 passes through end 21B into cavity 36.

Figure 4:
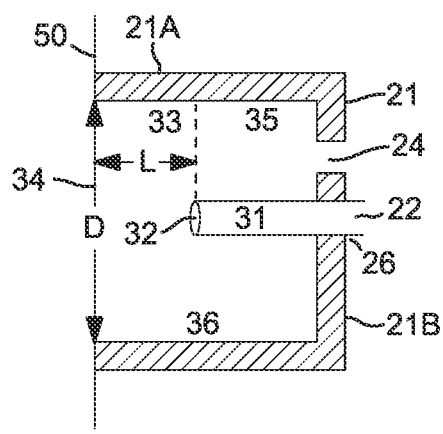
FIG. 4 is a cross-sectional view of another embodiment of equipment with which the present invention can be practiced.

FIG. 4 depicts another embodiment of the nozzle body 21 with which the present invention can be practiced. Feed tube 31 extends into cavity 36 toward discharge opening 34 partway (that is, less than the total distance) between where it enters through end 21B and discharge opening 34. Feed tube 31 preferably has an outer sleeve or layer to inhibit heat transfer to liquid nitrogen within feed tube 31 from the surrounding atmosphere in upstream cavity 35. The downstream end 32 of feed tube 31 is within cavity 36. The portion of cavity 36 between end 21B and downstream end 32 can be referred to as upstream cavity 35, and the portion of cavity 36 between downstream end 32 and discharge opening 34 can be referred to as downstream cavity 33.

Figure 5:
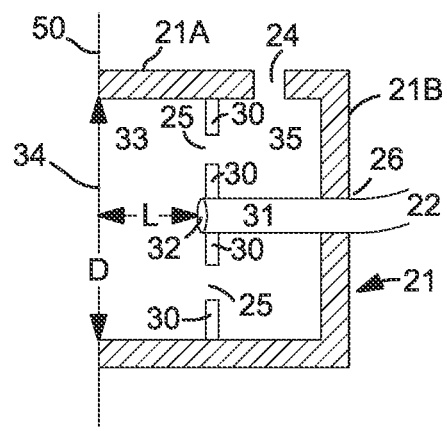
FIG. 5 is a cross-sectional view of yet another embodiment of equipment with which the present invention can be practiced.

FIG. 5 illustrates another embodiment of equipment with which the present invention can be practiced. In this embodiment, a feed plate 30 is provided within what had been referred to as cavity 36. Feed plate 30 is preferably perpendicular to the central longitudinal axis of cavity 36. Feed plate 30 separates cavity 36 into upstream cavity 35 (which is between end 21B and feed plate 30) and downstream cavity 33 (which is between feed plate 30 and discharge opening 34). Feed tube 31 extends from opening 26 and passes through feed plate 30 and opens at downstream end 32 which is an opening through feed plate 30 which is at the upstream end of downstream cavity 33. Feed tube 31 has an upstream end 22 that can be connected to line 16 through which liquid nitrogen is conveyed into feed tube 31. Feed tube 31 preferably has an outer sleeve or layer to inhibit heat transfer to liquid nitrogen within feed tube 31 from the surrounding atmosphere in upstream cavity 35. While opening 24 as shown in FIG. 5 passes through a side 21A of nozzle body 21, opening 24 can be in end 21B instead. One end of feed line 17 can be connected to the external end of opening 24, so that gaseous nitrogen or other gaseous composition can be conveyed from line 17 into upstream cavity 35. There can be one or more than one opening 24, each connected to a line 17. When feed plate 30 is employed, there should be at least one opening 25 through feed plate 30 to permit gas to flow from upstream cavity 35 to downstream cavity 33. Any such opening can be a hole, or can be an annular opening formed through feed plate 30. In this embodiment, downstream cavity 33 opens at its discharge opening 34 at which the nozzle body 21 is attached to wall 50 to match with a hole in wall 50. Preferably, the central axis of discharge opening 34 is perpendicular to wall 50. The downstream cavity 33 is typically cylindrical.

The dimensions of the nozzle body, and of the respective cavity or cavities, that provide satisfactory operation of this invention can be determined by evaluation of the effective diameter of discharge opening 34 (referred to herein as D), the axial length (referred to herein as L) of the relevant cavity, and the relationship between the diameter D and the axial length L, that are effective for a given installation.

In many situations, the cavity 36 and downstream cavity 33 and discharge opening 34 are typically cylindrical. If the cross-sectional shape of discharge opening 34 is a circle, then the effective diameter D of discharge opening 34 is the diameter of that circle, measured at the locations shown in FIGS. 3, 4 and 5. If the cross-sectional shape of discharge opening 34 is not circular, then the effective diameter D of discharge opening 34 is the diameter of an imaginary circle that has the same cross-sectional area as the cross-sectional area of the actual cross-section of discharge opening 34. Preferred values of D can be on the order of 0.1 inch to 1.0 inch. The axial length L is the distance from the discharge opening 34 to the downstream end of feed tube 31. When a feed tube 31 is present having its downstream end 32 within cavity 36, such as in the embodiments depicted in FIGS. 4 and 5, L is the axial distance from the discharge opening 34 to the downstream end 32 of feed tube 31. In embodiments wherein the downstream end 32 of feed tube 31 is in end 21B, then L is the axial distance from downstream end 32 at the interior surface of end 21B to discharge opening 34. Preferred values of L are greater than zero up to a length on the order of 1.5 inches. Preferably the ratio of D to L (when D and L are expressed in the same units) is 0.25 to 1.5, more preferably less than 0.5.

The nozzle bodies 21 can be constructed preferably of polymeric material because of its low heat conductivity. When a feed tube 31 is present it is preferably made of metal.

In operation, liquid nitrogen is fed from tank 11 via line 16, into nozzle body 21. In the embodiment of nozzle body 21 that is shown in FIGS. 3 and 4, the liquid nitrogen is fed into cavity 36. In the embodiment that is shown in FIG. 5, the liquid nitrogen is fed into and through feed tube 31, and out of downstream end 32 into downstream cavity 33. In each of these embodiments, the liquid nitrogen then flows toward discharge opening 34.

At the same time, gaseous nitrogen (which can be from tank 11 or from another source) or other gas or gaseous composition (which is provided from another source) is fed via line 17 into nozzle body 21. In the embodiments of FIGS. 3 and 4, the nitrogen or other gas is fed through opening 24 into cavity 36. In the embodiment of FIG. 5, the nitrogen or other gas is fed through opening 24 into upstream cavity 35 and then through hole or holes 25 in feed plate 30 into downstream cavity 33. The gaseous nitrogen flows toward discharge opening 34 of cavity 33.

The flow of gaseous nitrogen or other gas contacts the exterior surface of the stream of liquid nitrogen inside cavity 36, or inside downstream cavity 33, depending on which embodiment is being employed. The coolant stream of liquid nitrogen has an outer layer of gas around at least part of the outer surface of the liquid nitrogen, as the coolant stream passes out of discharge opening 34. The gas preferably surrounds the liquid nitrogen. The coolant stream which comprises the liquid nitrogen and the gaseous nitrogen or other gas may also include a layer of mixed liquid and gas, between the liquid nitrogen and the outer layer of nitrogen or other gas. To achieve these objectives, it is preferred to inject the gas (nitrogen or other gas) into the nozzle body upstream of where the liquid nitrogen enters the cavity 36 or downstream cavity 33 in the nozzle body.

This coolant stream flows out of the discharge opening 34 into the particulate material in the carrier. When the particulate material is in a stream that is flowing through a conduit, the coolant stream flows into the stream of material in the conduit. When the particulate material is in a carrier such as a mixer or blender, it flows into the particulate material that is being moved past the discharge opening 34.

Providing the layer of gas on the outside of the liquid nitrogen stream is assisted by appropriate positioning and orientation of the one or more holes 24 through which the gas enters the nozzle body, and by the appropriate positioning of holes or other openings 25 through feed plate 30 if the feed plate is present, so that the gas is fed in a direction likely to provide the gas between the liquid nitrogen and the interior walls of the respective cavities within the nozzle body. This objective is also assisted by feeding the gas at velocities and mass flow rates such that the nitrogen or other gas that enters into cavity 33 or cavity 36, as the case may be, establishes a layer of gas around at least a portion of the flowing stream of liquid nitrogen.

Providing the layer of gas at the outer surface of the liquid nitrogen stream, as the coolant stream passes out of the discharge opening 34, protects against excessive cooling of the interior surface of wall 50 near the opening 34. Doing so also enables the cold liquid nitrogen to penetrate farther into the mass of particulate material before the liquid disperses, thereby enabling better and more widespread cooling of the mass of particulate material. Otherwise, there is a risk that the cooling effect of the liquid nitrogen would be wasted in excessive cooling (or even freezing) in the immediate vicinity of the opening 34, and insufficient cooling in the mass of particulate material at distances farther from the opening 34.

The method of this invention, including the feeding of liquid nitrogen and the nitrogen or other gas, could be carried out on a continuous basis or could be carried out in intermittently stages or on a batch basis. When the flow of liquid nitrogen is interrupted, such as between stages, it is useful to purge the feed lines and feed tube of liquid nitrogen such as by passing a gas through the respective lines(s). Typical operating conditions include but are not limited to these:

Liquid nitrogen feed rate into cavity 36 or downstream cavity 33: 0.5 to 1.5 pounds per minute, preferably 0.75 to 1.5 pounds per minute.

Liquid nitrogen temperature entering cavity 36 or downstream cavity 33: minus 270 degrees F. to minus 305 degrees F.

Feed rate of gaseous nitrogen or other gas into cavity 36 or downstream cavity 33: 0.1 to 1.0 scfm Temperature of gaseous nitrogen or other has entering cavity 36 or downstream cavity 33: zero to 120 degrees F.

Pressure of liquid nitrogen entering the nozzle body: 20 to 60 psig

Pressure of gaseous nitrogen or other gas entering the nozzle body: 15 to 25 psig The operation of the method of the present invention, in any particular specific application, is preferably controlled by reference to the temperature of the material in the carrier (that is, in the conduit or vessel, as the case may be) measured at a point a given distance away (preferably downstream in the direction of flow as depicted in FIG. 1) from the location or locations where the coolant stream is being fed into the particulate material. For example, in the case of feeding the coolant stream into a conduit through which the particulate material is flowing, temperature sensor 40 can be used to detect the temperature of the material in conduit 7, using a probe or other sensor of conventional knowledge, and in response to any differences between the detected temperature (which is communicated to controller 14 for example via line 47, as shown in FIG. 1, or wirelessly) and the desired temperature of the material, the flow of nitrogen coolant that is provided via lines 16 and 17 is increased, decreased, or maintained, by controller 14 as necessary to maintain the temperature of the material at temperature sensor 40 within a desired range.

What is claimed is:

1. A method of cooling particulate material, comprising feeding liquid nitrogen into a cavity in a nozzle body, wherein the cavity has an open discharge opening, to form a stream of the liquid nitrogen in the cavity, wherein the nozzle body is attached to the exterior of a wall of a carrier having an opening through the wall so that the discharge opening of the cavity is aligned with said opening, feeding a gaseous product out of an opening into the cavity, so that the gaseous product is in contact with the outer surface of the stream of liquid nitrogen within the cavity thereby forming a coolant stream in the cavity that consists of an outer layer of the gaseous product around at least a portion of the outer surface of the stream of the liquid nitrogen, and passing the coolant stream out of the discharge opening of the cavity directly through the opening in the carrier wall into particulate material in the carrier while the particulate material is in motion passing the discharge opening, so that the coolant stream contacts and cools the particulate material in the carrier.

2. The method according to claim 1 wherein the gaseous product comprises nitrogen.

3. The method according to claim 1 wherein the particulate material is particulate food product.

4. The method according to claim 1 wherein the carrier is a conduit through which the particulate material entrained in transport gas flows past an opening through the conduit wall, while the coolant stream is passed out of the discharge end of the nozzle body through the opening in the conduit wall and into the particulate material.

5. The method according to claim 4 wherein the particulate material is particulate food product.

6. The method according to claim 5 wherein the particulate material is selected from the group consisting of starches, sugars, cocoa powder, and mixtures thereof.

7. The method according to claim 5 wherein the particulate material is flour.

8. The method according to claim 1 wherein the carrier is a vessel in which the particulate material is held and is moved past an opening through the vessel wall, while the coolant stream is passed out of the discharge end of the nozzle body through the opening in the vessel wall and into the particulate material.

9. The method according to claim 8 wherein the particulate material is particulate food product.

10. The method according to claim 1 wherein liquid nitrogen and the gaseous product are fed into the nozzle body at a rate of 0.5 to 20 pounds of liquid nitrogen per scf of gaseous product.

11. The method according to claim 1 wherein liquid nitrogen and the gaseous product are fed into the nozzle body at a rate of 0.1 to 20 pounds of liquid nitrogen per scf of gaseous product.

12. The method according to claim 1 wherein the discharge opening has an effective diameter D which is 0.1 inch to 1.0 inch, wherein the effective diameter of a discharge opening whose cross-sectional shape is a circle is the diameter of that circle and the effective diameter of a discharge opening whose cross-sectional shape is not a circle is the diameter of an imaginary circle that has the same cross-sectional area as the cross-sectional area of the actual cross-section of the discharge opening, and the axial distance L from the discharge opening to the opening from which gaseous product is fed into the cavity is greater than zero up to 1.5 inches.

13. The method according to claim 12 wherein the ratio of D to L expressed in the same units is 0.25 to 1.5.

* * * * *